United States Patent
Gunter et al.

[11] Patent Number: 5,803,954
[45] Date of Patent: Sep. 8, 1998

[54] PARTICULATE FILTER COLLECTOR ARRANGEMENT AND METHOD

[75] Inventors: L. Alan Gunter, County of Jefferson; Keiron P. O'Connell, County of Oldham; George Matis, County of Jefferson, all of Ky.

[73] Assignee: AAF International, Louisville, Ky.

[21] Appl. No.: 835,996

[22] Filed: Apr. 11, 1997

[51] Int. Cl.⁶ .......................... B01D 46/04; B01D 50/00
[52] U.S. Cl. .................. 95/268; 55/283; 55/302; 55/324; 55/341.7; 55/429; 55/484; 55/498; 55/502; 95/280
[58] Field of Search .............. 55/274, 302, 283, 55/341.4, 341.7, 341.1, 324, 323, 335, 330, 428, 429, 498, 502, 472, 473, 484; 95/268, 273, 280, 286

[56] References Cited

U.S. PATENT DOCUMENTS

| | | | |
|---|---|---|---|
| 1,818,736 | 8/1931 | Moore | 55/324 |
| 2,072,906 | 3/1937 | Rosenberger | 55/341.7 |
| 2,507,335 | 5/1950 | Donohue | 55/341.7 |
| 2,622,696 | 12/1952 | Pegg et al. | 55/429 |
| 3,204,390 | 9/1965 | Heyl | 55/341.7 |
| 3,377,783 | 4/1968 | Young | 55/302 |
| 3,421,295 | 1/1969 | Swift et al. | 55/341.7 |
| 4,174,204 | 11/1979 | Chase | 55/283 |
| 4,214,882 | 7/1980 | Brenholt | 55/302 |
| 4,395,269 | 7/1983 | Schuler | 55/302 |
| 4,415,343 | 11/1983 | Margraf | 55/341.7 |
| 4,443,235 | 4/1984 | Brenholt | 55/218 |
| 4,445,913 | 5/1984 | Nishiyama | 55/302 |
| 4,452,616 | 6/1984 | Gillingham et al. | 55/302 |
| 4,680,039 | 7/1987 | Revell | 55/429 |
| 5,000,767 | 3/1991 | Sanders et al. | 55/429 |
| 5,062,872 | 11/1991 | Williams | 55/302 |
| 5,342,519 | 8/1994 | Friedmann et al. | 210/232 |

FOREIGN PATENT DOCUMENTS

2088744   6/1982   United Kingdom .

*Primary Examiner*—Duane S. Smith
*Attorney, Agent, or Firm*—Polster, Lieder, Woodruff & Lucchesi

[57] ABSTRACT

A unique pulse-jet cartridge type particulate collector structure and method wherein horizontally disposed particulate filter cartridges are suspendedly disposed in a particulate separation chamber defined by an outer wall so that opposite ends of the suspended particulate filter cartridges are spaced from the opposed inner faces of the outer wall with dirty gas flow being delivered from a dirty gas inlet in the outer wall through the particulate filter cartridges in a smooth manner by a large particulate particle deflector and with the particulate hopper connected to the lower section of the outer wall having a transparent particulate catching container removably sealed in communicative relation with the particulate release opening of the particulate hopper.

34 Claims, 6 Drawing Sheets

PARTICULATE FILTER COLLECTOR ARRANGEMENT AND METHOD

BACKGROUND OF THE INVENTION

The present invention relates to particulate filtration and collection systems and more particularly to an improved heavy duty cartridge-type particulate filter collector arrangement of the pulse-jet type.

Pulse-jet cartridge particulate collectors are generally well known in the particulate filtration art. In most of the commercial units presently available on the market, cylindrical particulate filtration cartridges are disposed within an outer walled, bolted housing with the lineal axes of the spaced particulate filter cartridges either being disposed within the housing in the vertical or in the horizontal position with respect to such outer wall housing. Problems have arisen in both of these past arrangements. In the past, when particulate filter cartridges have been disposed vertically in spaced relation they usually have been loaded in the housing so as to be completely within the outer wall of the housing in spaced side-by-side relation with difficulties arising in the loading, maintenance, jet pulsing in cleaning, the accessibility of individual cartridges and in comparative operating pressures and efficiencies. When past particulate filter cartridges have been disposed in the housing horizontally in spaced relation, they conventionally have been loaded through ports in the outer wall with like corresponding ends of the particulate filter cartridges depending directly upon the outer wall of the particulate separation chamber defining housing for cartridge alignment and for partial support. Although individual particulate filter cartridge loading and cartridge accessibility had been simplified with such an arrangement, outer housing wall stresses have arisen, leading to housing leakage, cartridge misalignments and problems in operating filter efficiencies, maintenance, and accessibility to the housing interior for cleaning purposes.

Several patents are known in the prior art generally disclosing outer wall housings with spaced dirty gas inlet means and clean gas outlet means, the housings including several communicating compartments respectively incorporating particulate filter cartridge assemblies, reverse pulse-jet or cartridge twisting assemblies, motor and blower assemblies and particulate hopper arrangements. In U.S. Pat. No. 4,174,204, issued to F. R. Chase on Nov. 13, 1979, and in U.S. Pat. No. 4,214,882, issued to D. L. Brenholt on Jul. 29, 1980 such general arrangements are disclosed, each of these patents including an inclined sectioning wall defining in part the particulate filter cartridge chamber. In U.S. Pat. No. 4,395,269, issued to F. E. Schuler on Jul. 26, 1983, the particulate filter cartridges have the longitudinal axes thereof arranged at an incline in the compartment in which they are disposed; in U.S. Pat. No. 4,443,235, issued to D. L. Brenholt et al on Apr. 17, 1984, a single filter cartridge twisting assembly is disclosed; and, finally in U.S. Pat. No. 5,342,519, issued to F. A. Friedman et al on Aug. 30, 1994, a comparatively complex filter cartridge mounting head for a replaceable filter element disposed in the cartridge is disclosed.

The present invention, patentably distinguishing over prior art arrangements, provides a unique, novel and compact, one package, heavy duty, jet-pulse type cartridge particulate filter collector, which minimizes the problems of the past jet-pulse collectors and which is comparatively efficient, economical and straight forward in construction, assembly, operation and maintenance with comparatively minimal leakage, allowing for ready modular filter capacity modification of the overall structural arrangement. Further, the present invention provides for a unique particulate filter cartridge arrangement, accommodating for large particle removal and smooth fluid flow to particulate filter cartridges and removal of particulate and clean gas flow therefrom and, at the same time, minimizing cartridge seal breaking and gasket contamination. In addition, the present invention provides a unique structure for optimal positioning and fastening of particulate filter cartridges allowing uniform fluid flow in the particulate filtration and jet-pulse removal operations. In addition, the present invention provides for a unique adjustment of jet-pulse structure with ready but removed access to solenoid structure associated therewith, along with other unit controls and, at the same time, the present invention allows for easy and ready visual observational assessment of more significant operational gauges and for final particulate container collection. Moreover, the present invention provides for ready access for interior housing cleaning, for optimum unit sealing with concomitant over-all operational noise reduction, allowing ready access for efficient particulate container insertion and removal with the particulate container being readily and uniquely sealed to the particulate hopper during particulate filtering operations.

Various other features of the present invention will become obvious to one skilled in the art upon reading the disclosure set forth herein.

BRIEF SUMMARY OF THE INVENTION

More particularly the present invention provides for a unique and novel particulate filter structure comprising: an enclosed outer housing wall having inner and outer faces with the inner face defining a particulate separation chamber therein, the outer housing wall having spaced dirty gas inlet means and clean gas outlet means in communication with the particulate separation chamber defined by the outer housing wall; longitudinally extending particulate filter means disposed between spaced end support means within the particulate separation chamber with the longitudinally extending particulate filter means being in spaced relation to the inner face of the outer wall; blower means to move a particulate laden gas stream from dirty gas inlet means through the particulate filter means to the clean gas outlet means; baffle means disposed in the particulate separation chamber downstream the dirty gas inlet means and upstream the longitudinally extending particulate filter means to absorb particulate momentum, deflect larger particulate particles around the longitudinally extending particulate filter means and evenly distribute air flow to the cartridges; reverse fluid flushing means to flush particulate particles from the longitudinally extending particulate filter means; and, particulate hopper collection and catcher means communicating with the particulate separating chamber to receive the baffle deflected larger particulate particles and the reverse flushed particulate particles. In addition the present invention provides filtering structure comprising: an enclosed outer housing having inner and outer faces with the inner face thereof defining a particulate separation chamber therein, the outer housing wall having spaced dirty gas inlet means and clean outlet means in communication with the particulate separation chamber defined by the inner face of the outer housing wall; longitudinally extending particulate filter cartridge means supportively disposed within the particulate separation chamber, the particulate filter cartridge means having spaced opposed ends; cartridge fastening and centering means at the spaced opposed ends of the particulate filter cartridge means to maintain the particulate filter cartridge means in removable, preselected fastened position within the particulate separation chamber with at least one end of the filter cartridge means being in spaced and independent relation from a directly opposed portion of the inner face of the outer housing wall; fluid flushing means disposed within the particulate separation chamber in aligned communication with the particulate filter cartridge means to flush entrained particulate particles therefrom; blower means to move a particulate laden gas stream from the dirty gas inlet means through the particulate filter cartridge means to the clean gas outlet means and particulate hopper and catcher means adapted to be mechanically leveraged and sealed into removable communicative relationship with the particulate separation chamber. Further, and in addition, the present invention provides a unique structure for adjustably pushing one end of the particulate filter cartridge means into releasably fastened engagement in the particulate separation chamber with the opposite end of the particulate filter cartridge means engaging in sealed relation with a ported tube sheet to be aligned with an adjustable jet-pulse flushing mechanism—the solenoid controls for the jet-pulse flushing mechanism being remotely but accessibly located with other controls at the rear of the housing and with more critical operational sight gauges being located for ready viewing at the front of the housing and, with both ends of the particulate filter cartridge means being spaced from the inner face of outer wall housing portions. Also, the present invention provides unique baffling structure adjacent the fluid inlet means and intermediate the filter cartridge means to filter out large particulate matter upon housing entrance and to prevent particulate migration and aspiration between spaced filter cartridges during reverse cleaning operations.

Further, the present invention provides an inventive method of removing particulate matter from a particulate laden gas stream comprising: introducing the gas stream into an enclosed gas treating zone having a spaced dirty gas inlet and a clean gas outlet with communicating first, second, third and fourth gas stream treating sections therebetween; moving the gas stream through spaced particulate deflection and filtration stations in the first section of the gas treating zone at sufficient velocity to deflect and divert large particulates from the gas stream to a particulate collector station in the communicating second section in the enclosed zone and passing the gas stream to the clean gas outlet through the filtration station in the first section into the third and fourth communicating sections having reverse flushing and blower stations respectively therein; and, passing a reverse flushing fluid stream from the reverse flushing station in the third communicating section in the enclosed zone to the first communicating section in the first section of the zone to move entrained particulate matter from the filtration station therein to the particulate collection station in the second communicating section.

It is to be understood that one or more changes can be made by one skilled in the art in one or more of the several parts of the inventive structure and in one or more of the inventive method steps disclosed herein without departing from the scope or spirit of the present invention.

BRIEF DESCRIPTION OF THE DRAWINGS

Referring to the drawings which disclose one advantageous embodiment of the present invention.

DETAILED DESCRIPTION OF THE INVENTION

Referring to FIGS. 1–3, 7 and 8 of the drawings, the novel particulate filter structure is disclosed as including an enclosed outer housing wall 2, which advantageously can be formed from a sturdy steel sheet material or from any other suitable material of a preselected gauge.

After the several sides of the housing are cut or stamped from steel sheet material, the sides can be welded together, rather than bolted, so as to minimize fluid leakage. Outer wall 2 includes a top side 3, spaced front and rear sides 4 and 6 and spaced lateral sides 7 and 8 extending between the spaced front and rear sides. The spaced sides of outer wall 2 include inner and outer faces, with the welded inner faces of the sides serving to define particulate separation chamber 9 to include upper and lower sections.

The top side 3 of outer housing wall 2 is provided with spaced dirty gas inlet top and side ports 11 and 12 and a clean gas outlet port 13, all of the ports having removeable closing plates (not shown) and being communicable through the sections of the aforedescribed particulate separation chamber 9 when not closed. In this regard and as can be seen in FIG. 1 of the drawings, the particulate separation chamber 9 is appropriately partitioned into four (4) communicating sections so that dirty gas and clean gas flow streams are substantially separated, the separated sections being communicative through suitable ports (not shown).

It is to be understood that appropriate port covers or access panels can be utilized with top and side dirty gas inlet ports 11 and 12 in top side 3 and lateral sides 7 and 8, the ports being accessible from areas on either or both lateral sides 7 and 8 of the drawings. It is to be noted that the lower portion of front side 4 of outer housing wall 2 is provided with a cartridge access opening 14, which opening 14 communicates with the lower section of particulate separation chamber 9. The opening is sized to allow insertion and horizontal mounting of two spaced cylindrical particulate filter cartridges described in detail hereinafter. Referring to FIG. 1 of the drawings, it can be seen that the clean gas outlet port 13 in top side 3 can be provided with a suitable gate damper which alternatively can be constructed as a separate damper unit (not shown) or as part of a fan and motor access panel 16 as shown.

As can be seen in the partially broken away schematic view of FIG. 3, portable larger particle deflecting baffles 17 mountable within the upper section of particulate separation chamber 9 adjacent uncovered dirty gas inlet ports 11 and 12 and spaced therefrom by support rods 17' serve to absorb the energy of and deflect larger particulate particles which might be entrained in such dirty gas streams downwardly within the housing toward the particulate hopper below the lower section of particulate separation chamber 9 with the remainder of such dirty gas streams flowing uniformly and evenly distributed toward the lower section of particulate separation chamber 9.

Figure 1:
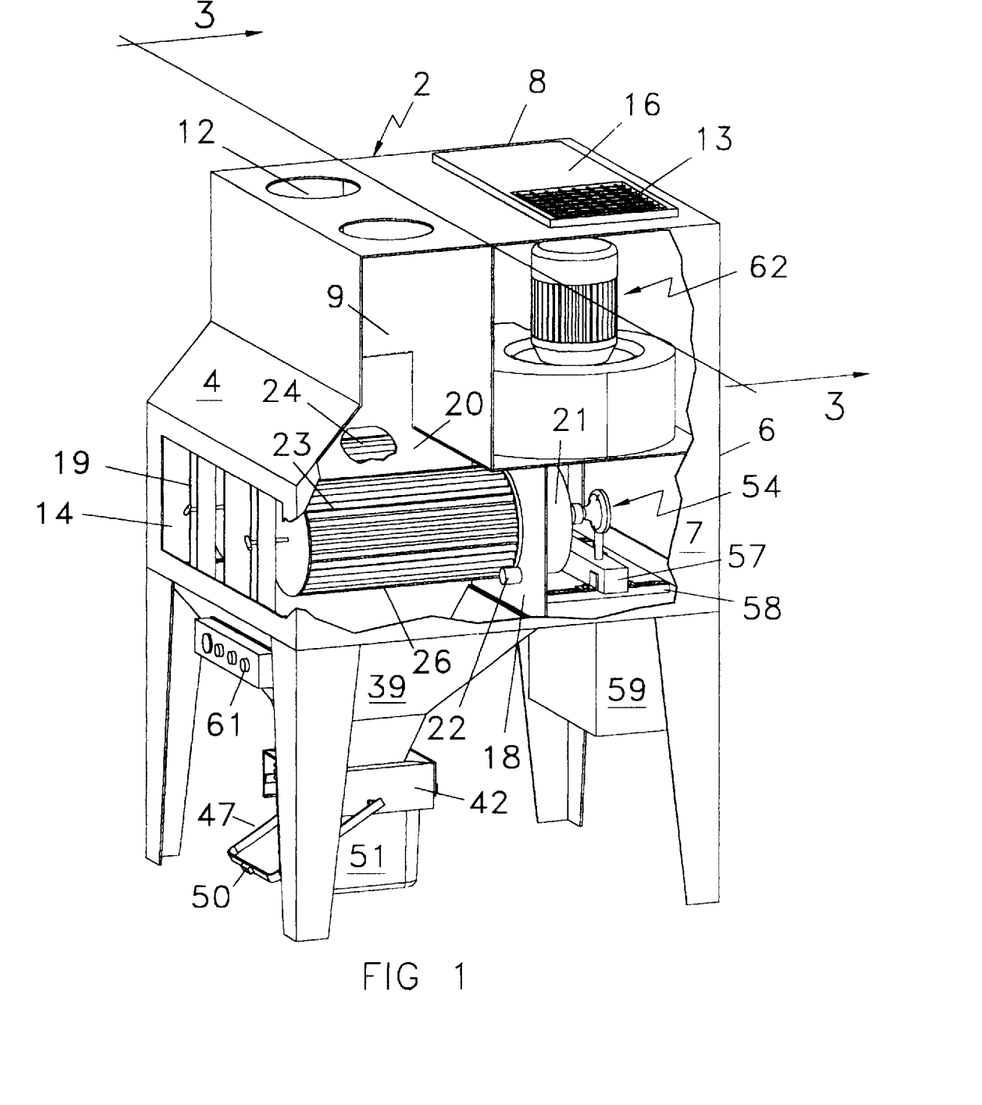
FIG. 1 is a partially broken away isometric front and side view of the novel particulate filter structure, disclosing at least in part several of the unique features of the present invention including the dirty gas inlets and clean gas outlet arrangement, the motor and blower arrangement, a portion of the particulate deflecting baffle arrangement, the particulate filter cartridge assembly with a portion of the baffle member therebetween, the hopper assembly and, the adjustable reverse flow pulse-jet assembly with a portion of the fluid guide tube projecting from the tube header.
Figure 2:
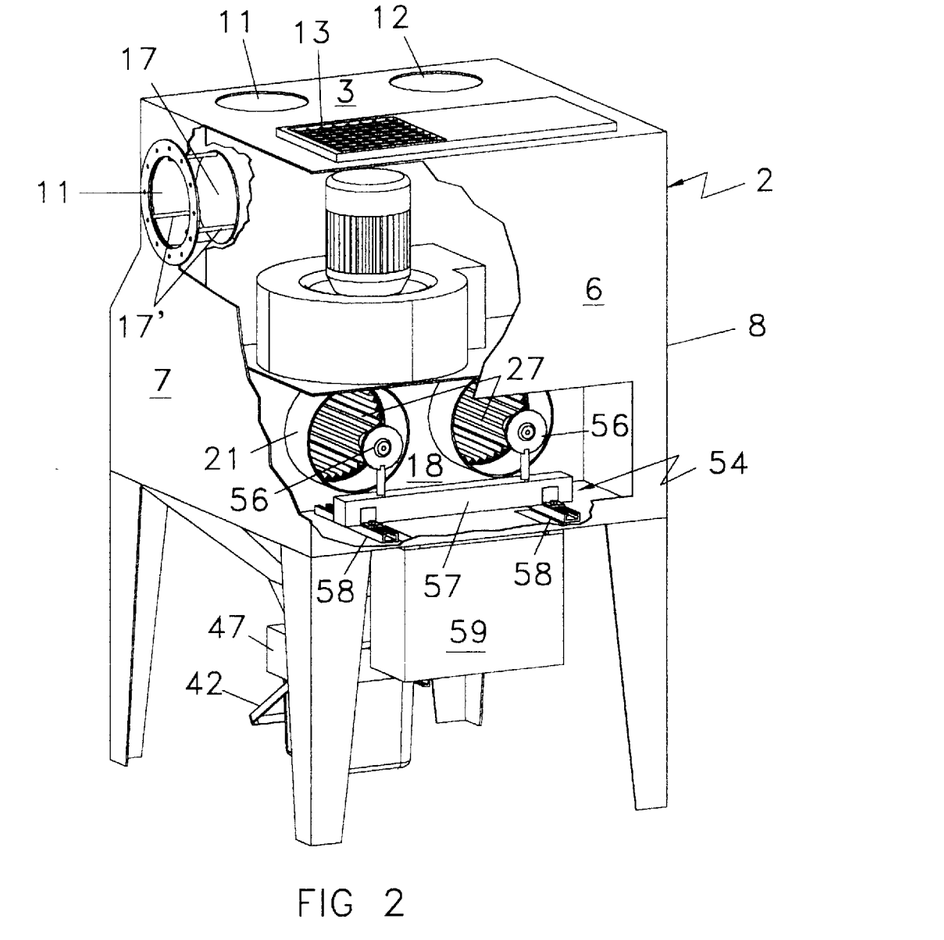
FIG. 2 is a partially broken away isometric rear and side view of the particulate filter structure of FIG. 1, disclosing further details of the adjustable reverse flow pulse-jet assembly and fluid guide tube of FIG. 1.
Figure 3:
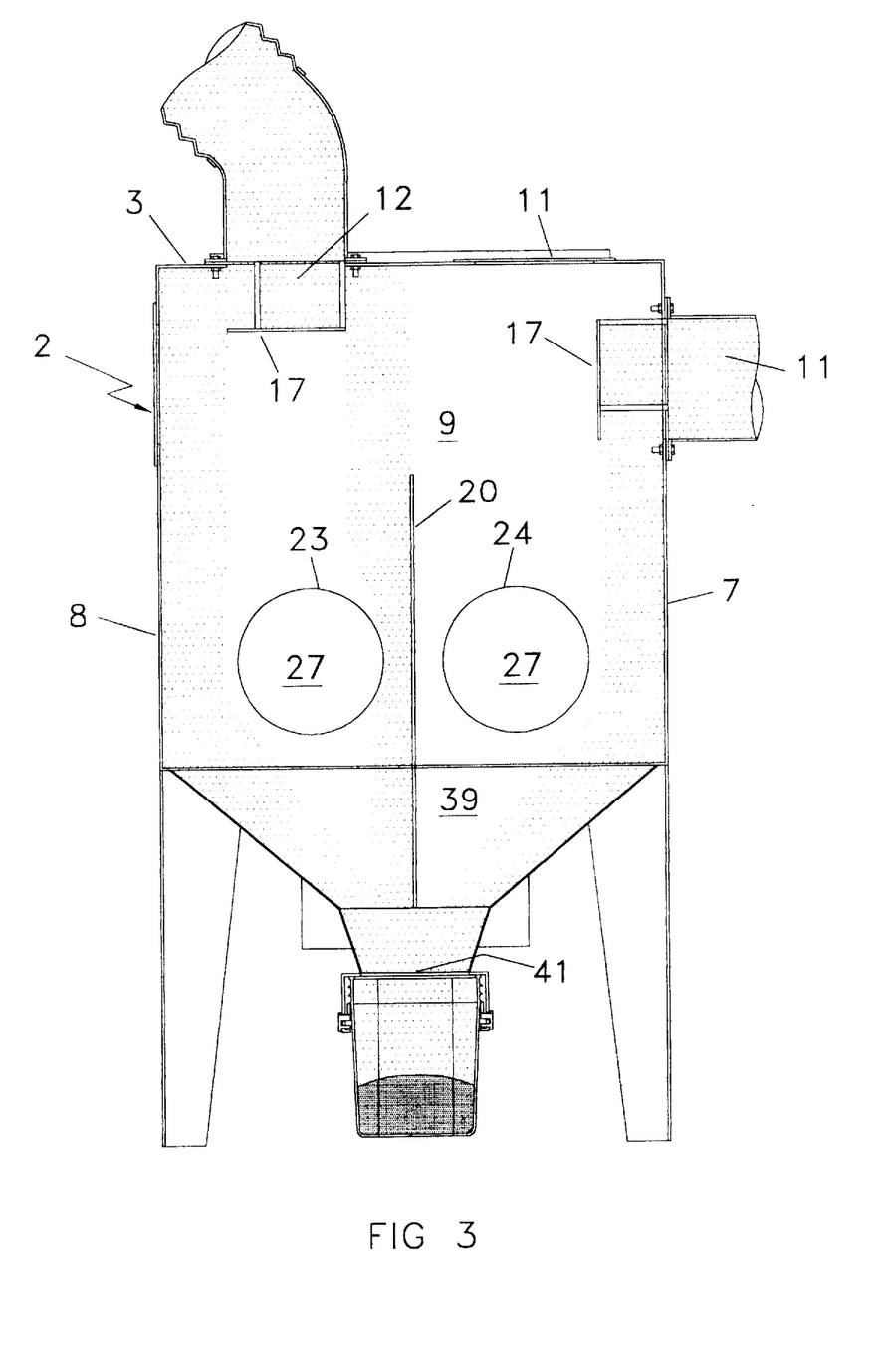
FIG. 3 is an enlarged, schematic, cross-sectional side view of the structure of FIGS. 1 and 2, taken in a plane through line 3—3 of FIG. 1, disclosing alternative usage of one of the dirty gas inlets on the housing sides, the incoming dirty gas inlet flow, the unique particulate deflector inlet baffle arrangement, the schematic positioning of the particulate filter cartridges with respect to the dirty gas flow, and the intermediate baffle between spaced filter cartridges to minimize particulate migration between filter cartridges during reverse flow operations.
Figure 4:
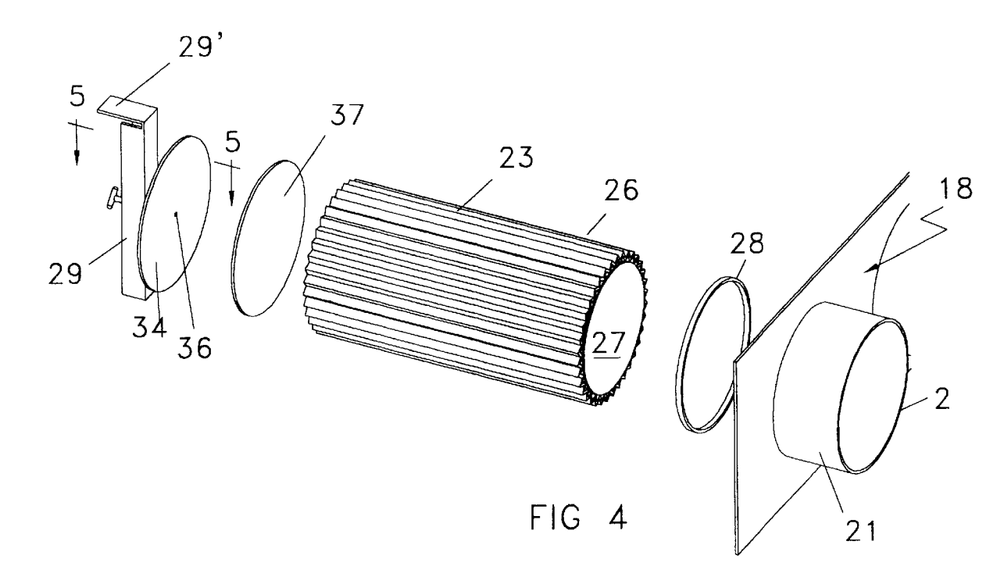
FIG. 4 is an enlarged exploded schematic isometric view of the novel push plate, actuator and ported tube header arrangement of FIGS. 1 and 2 for mounting the particulate filter cartridges in suspension so that opposite ends thereof can be in spaced relation to directly opposed inner faces of the outer wall of the unique particulate filter structure.

Referring to FIGS. 1–5 of the drawings, the lower section of particulate separation chamber 9 includes two spaced cartridge end support members 18 and 19, respectively, which are selectively spaced from the directly opposite inner faces of outer wall 2. Cartridge end support member 18 is in the form of a sectioning tube sheet having at least two spaced cartridge receiving ports, the position of which is shown in FIG. 1 as indicated by reference numeral 18. As can be seen in FIG. 4, each port of ported tube sheet 18 is provided with a surrounding collar and tubular reverse fluid flow guide assembly 21 which extends along the perimeter thereof on that face of tube sheet support member spacedly adjacent the inner face of an adjacent side of outer housing wall 2. Although not shown in detail, each of the two ports of tube sheet 18 has fixed thereto a pair of spaced cartridge rest or support studs 22 (only one of the studs 22 of a pair of spaced studs being shown in FIG. 1) upon which a portion of each of the corresponding ends of filter cartridges 23 and 24 spacedly rest with the corresponding ends of each of the cartridges connected to the spaced ports of tube sheet 18. It is to be understood but not shown that the opposite ends of each cartridge rests on a channel on the inner face of the housing wall adjacent opening 14. This arrangement avoids the use of flow interfering cantilevering bayonets which have been used in the past. As known in the art, each particulate filter cartridge includes a cylindrically mounted outer filter media sheet 26 of a preselected type in accordance with the nature of the dirty gas streams to be treated. The outer cylindrical filter media sheets 26, each surround a longitudinally extending inner core 27 with one end thereof being open for reverse flushing through tubular fluid guide assembly 21. The corresponding ends of each filter cartridge 23 and 24, respectively, which are supported by ported tube sheet 18 are each provided with a surrounding, flexible cylindrical gasket 28 which can be of a suitably flexible material—and can be hollow in cross-section. Each flexible gasket 28 is sized to snugly engage and seal with the surrounding tubular fluid guide assembly 21.

The opposite corresponding ends of tube mounted particulate filter cartridge 23 and 24, respectively, are also directly spaced from the inner face of an opposed side wall of outer housing wall 2, and the inner open ended core 27 of each cartridge 23 and 24 communicates with at least one of the clean gas outlet ports 13.

Figure 5:
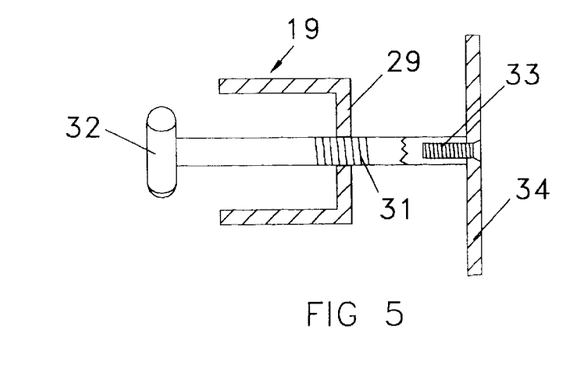
FIG. 5 is a further enlarged view taken in plane through line 5—5 of FIG. 4, disclosing further details of the threaded actuator mechanism.

Pursuant to another feature of the present invention and as also can be seen in FIGS. 4 and 5 of the drawings, the other support member 19 of the two spaced, particulate filter cartridge support members 18 and 19 comprises two spaced vertically extending U-shaped channels 29. Each U-shaped channel 29 is aligned with one of the ports in spaced tube sheet 18 and each channel 29 is positioned to be at the opposite end of one of the two particulate filter cartridges 23 and 24. Each U-shaped vertical channel 29 has a linearly and horizontally extending actuating rod 31 threadedly mounted in the longitudinally extending base leg and is arranged to be aligned with an opposite end of a rest supported dust filter cartridge. One end 29' of each base portion of U-shaped channel 29 is extended at a right angle to provide a resting ledge for the channel on an internal protrusion (not shown) above cartridge access opening 14. One end of each actuating rod 31 is shaped in the form of a T-bar handle 32 which serves as a turning handle for rod 31. The other end of each actuating rod 31 has screw mounted thereon one of two filter cartridge push plates 34. Each push plate 34 has opposed faces and a centrally disposed recessed aperture (not shown in detail) extending therethrough to receive the mounting screw 33 for connection to the end of an actuating rod 31. Each plate 34 is sized to be urged into sealing engagement with that end of each particulate filter cartridge opposite the tube sheet supported end. It is to be understood that each such particulate filter cartridge end can be provided if desired with a recessed end closing plate 37 serving to center and receive plate 34. It is to be noted in FIG. 3 that in order to minimize particulate migration and aspiration between adjacent spaced cartridges a vertical baffle member 20 extends therebetween. Such a baffle member is particularly desirable in two cartridge housings, with each filter cartridge serving to accommodate fifty percent (50%) of the fluid treatment.

Figure 6:
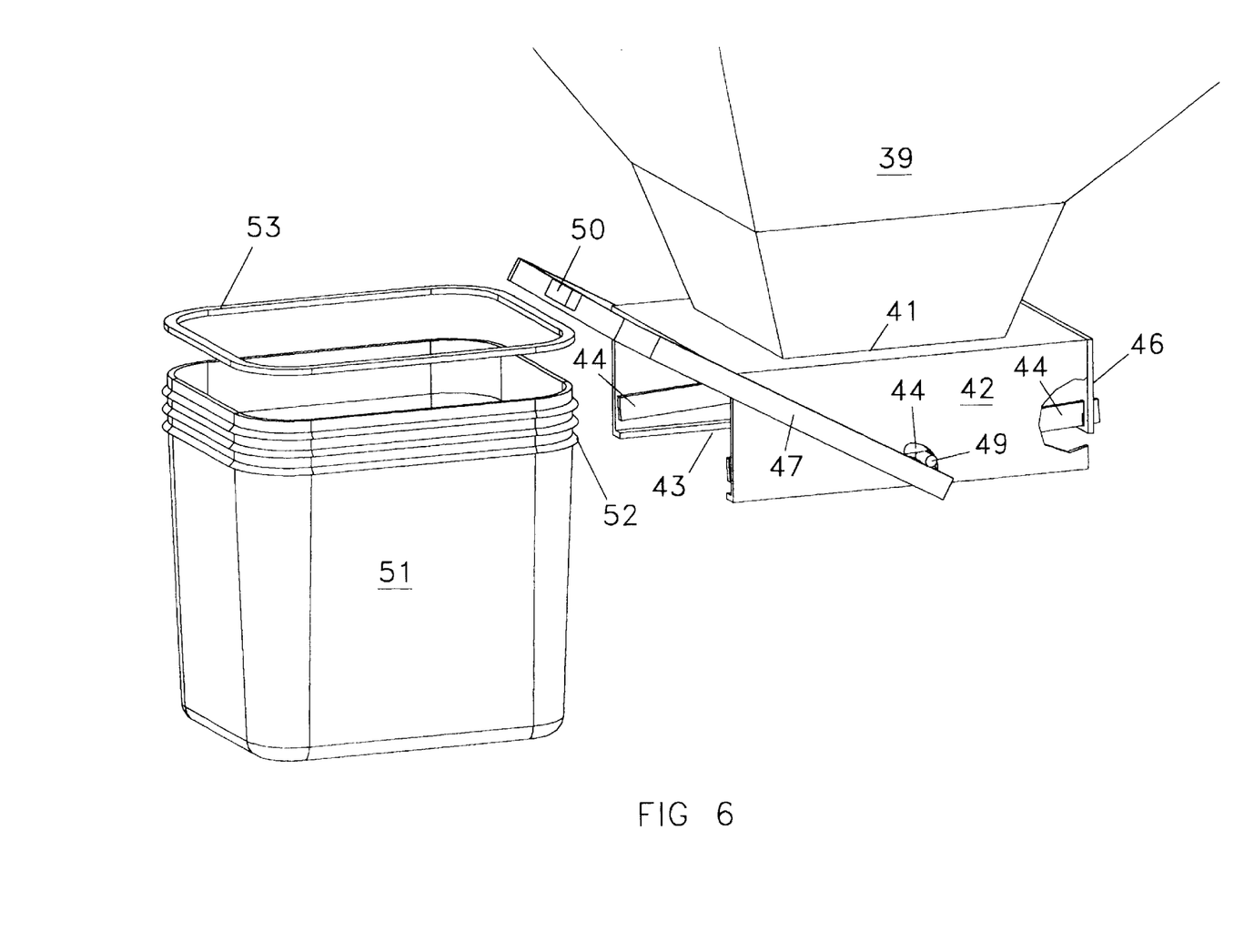
FIG. 6 is an enlarged exploded, isometric view of the bottom recessed opening of the particulate hopper, disclosing the novel particulate hopper extension with moveable support bars therein for the disclosed transparent particulate catcher container to be urged in sealed, particulate catching relation with the bottom recessed opening of the hopper; and, FIGS. 7 and 8 are two reduced front and rear views respectively of the overall novel structure as defined by the outer wall.
Figure 7:
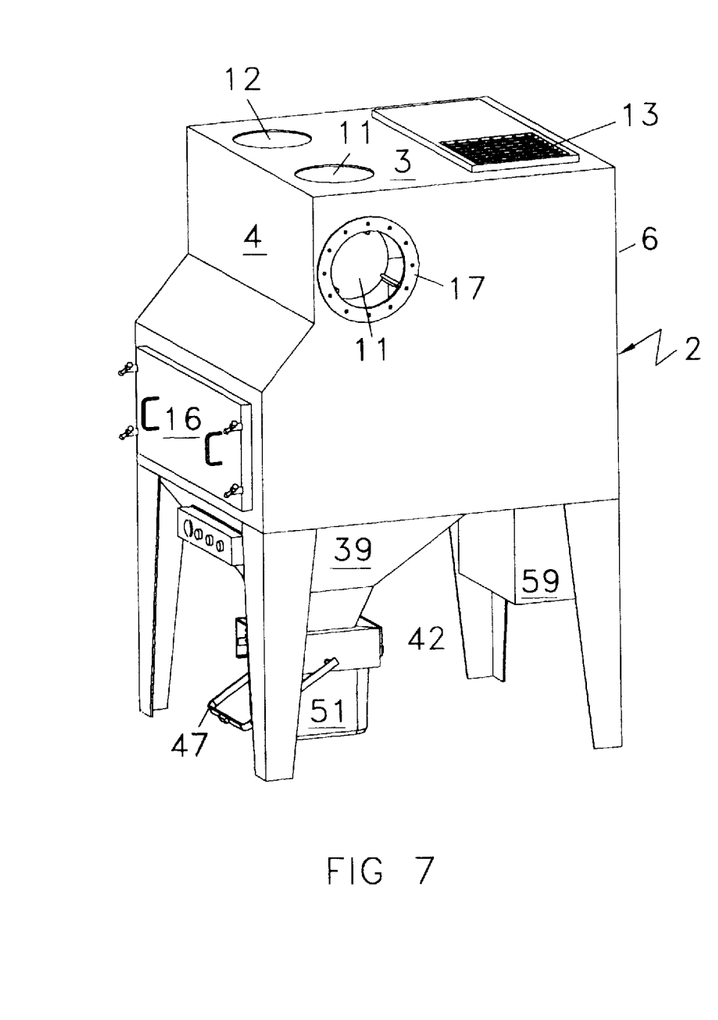
Figure 8:
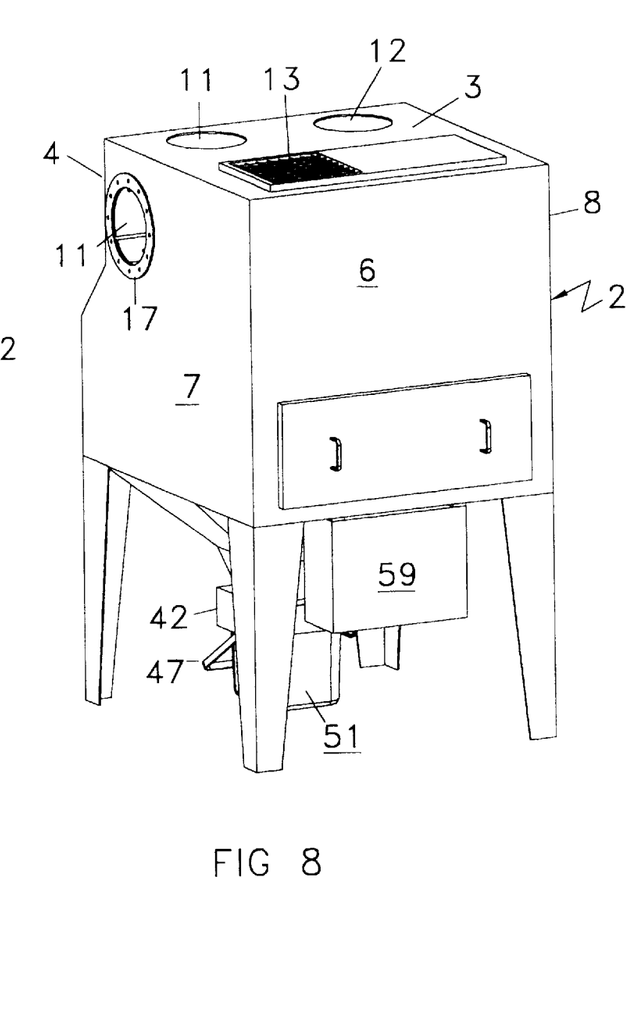

As can be seen in FIGS. 1–3 of the drawings, the lower portion of outer housing wall 2 is provided with a truncated downwardly and inwardly extending particulate hopper 39 which communicates with particulate separation chamber 9 with the lower portion of particulate hopper 39 terminating at the bottom in particulate release opening 41 (FIG. 3). Referring to FIG. 6 of the drawings, it can be seen that particulate hopper 39 is provided with a particulate catcher container extension support 42, which catcher extension support 42 is fixed to the bottom of particulate hopper 39 to horizontally extend therefrom in surrounding communicative relation to the particulate release opening 41 in particulate hopper 39. As can be seen in FIG. 6, the particulate catcher extension support 42 has a downwardly extending U-shaped cross-section with opposed inwardly turned rail support edges 43 extending in opposed alignment along the lower portion of extension support 42. A pair of spaced, opposed, particulate catcher support bars 44 are movably mounted on the rail support edges 43 with one end of each support bar being slidably and pivotally mounted in slotted extension member 46 (FIG. 6) extending downwardly from particulate hopper 39 along a side wall of particulate catcher container support 42.

As can be seen in FIG. 6 of the drawings, a U-shaped handle lever member 47 is pivotally mounted on the particulate catcher container extension support 42. Handle lever 47 is contoured to include over center cams 49 which engage moveable, pivotally mounted spaced support bars 44 resting on rail support edges 43 of particulate catcher container support 42. The over-center cams 49 serve to urge pivotally and movably mounted contain support bars 44 into a sealing position toward particulate release opening 41 of particulate hopper 39 when a suitable particulate catcher container 51 is mounted on container support bars 44. When handle lever 47 is in container release position, a magnetic holder bar 50 serves to hold the lever against the side of hopper 39. Advantageously, particulate catcher container 51 can be of a suitably transparent material, such as a transparent plastic, in order to allow for visual determination of the amount of particulate collected by the container. Referring to FIG. 6, it can be seen that particulate catcher container 51 is provided with at least one external peripheral flange 52 which is sized and positioned to rest on pivotally moveable support bars 44 when the container is placed into engagement with particulate catcher container extension support 42 and moved by U-shaped handle lever 47 into sealed engagement with particulate release opening 41 of particulate hopper 39 so as to capture discharged particulate from release opening 41. In this regard, it is to be noted that container 51 is provided with a resilient container sealing gasket 53 surrounding the top edge thereof to seal the container 51 against the periphery of particulate release opening 41.

To back flush the particulate filter cartridges 23 and 24, a suitable pulse-jet assembly 54 (FIGS. 1 and 2) is provided to intermittently send reverse direction pulse flow into each of the inner open ended cores 27 of cartridges 23 and 24 (the intermittent reverse fluid flow control circuit not being shown herein). In this regard and as can be seen particularly in FIG. 1 and 2 of the drawings, one of the unique features of the present invention is that spaced pulse jet nozzles 56 are communicatively mounted on a compressed fluid (advantageously pneumatic) container 57, the ends of which in turn are adjustably mounted on spaced guide rails 58 suitably secured within a lower divided section of particulate separation chamber 9 to allow for the "fine tuning" of the pulse-jet mechanism. Container 57 can be in selective communication with compressor equipment (not shown). It is to be noted that above such lower section which houses the pulse jet mechanism, an upper section communicating through suitable ports with particulate separation section of chamber 9, serves to house the motor driven blower assembly 62.

It is further to be noted that in accordance with still another feature of the present invention, the solenoids for pulse-jet assembly 54 are removed from assembly 54 to be placed, along with other controls in a rear housing mounted control box 59 which is conveniently accessible, and, as can be seen in FIG. 1, a visual status operating panel 61, displaying preselected critical data, is mounted in the front of the outer wall defined housing below the access opening to particulate filter cartridge assembly.

In a typical filtration operation, a particulate laden gas stream is introduced by blower assembly 62 into the particulate separation section of chamber 9 defined by outer wall 2 through dirty gas inlet ports 11 and or 12 with the larger particulates of the gas stream being deflected by baffles 11 away from baffle separated particulate filter cartridges 23 and 24 into particulate hopper 39. The dirty gas stream passes through filter cartridges 23 and 24 into inner open-ended core 27 and eventually to clean gas outlet port 13 communicating with blower assembly 62. Intermittently pulse-jet fluids from pulse-jet assembly 54 serve to reverse the fluid motion through particulate filter cartridges 23 and 24, dislodging entrained particulates into particulate hopper 39. Upon visual observation of the particulate collection in the particulate catcher container 51, the container can be removed, emptied and replaced into sealed engagement with hopper 39.

The invention claimed is:

1. A particulate filter structure comprising: an enclosed outer housing wall having inner and outer faces with said inner face thereof defining a particulate separation chamber therein, said outer housing wall having spaced dirty gas inlet means and clean gas outlet means in communication with said particulate separation chamber defined by said inner face of said outer housing wall; longitudinally and horizontally extending particulate filter cartridge means supportively disposed within said particulate separation chamber, said particulate filter cartridge means having spaced opposed ends; cartridge fastening means and centering means at spaced opposed ends of said particulate filter cartridge means to maintain said particulate filter cartridge means in suspended removable preselected fastened position within said particulate separation chamber with both ends of said filter cartridge means each being in spaced and independently supported relation by vertically extending spaced support members fastened at vertically opposed ends thereof and which are each spaced from a directly opposed portion of said inner face of said outer housing wall; reverse fluid flushing means disposed within said particulate separation chamber in aligned communication with said filter cartridge means to reverse flush entrained particulate particles therefrom; blower means to move a particulate laden gas stream from said dirty gas inlet means through said particulate filter cartridge means to said clean gas outlet means; particulate hopper means with a particulate release opening; and particulate catcher means adapted to be mechanically leveraged and sealed into removable communicative relationship with said release opening of said particulate chamber.

2. The particulate filter structure of claim 1, said cartridge fastening and centering means including a push plate member sized to be removabley urged into sealing end facing covering engagement against one end of said particulate filter cartridge means.

3. The particulate filter structure of claim 2, said push plate member being removably urged into said particulate filter cartridge means engaging position by an actuating member linearly and adjustably mounted on a structural support member within said particulate separation chamber and directly spaced from said inner face of said outer housing wall with one end of said actuating member serving as a turning handle and the opposite end serving to engage with said push plate member.

4. The particulate structure of claim 3, said push plate member having opposed faces with a recessed central aperture extending therethrough for screw mounting to said opposite end of said actuating member so that said plate member can be urged into sealing engagement with said one end of said particulate filter cartridge means.

5. The particulate filter structure of claim 1, said end of said particulate filter cartridge means adjacent said reverse flushing means being open ended to receive reverse flushing fluid therethrough; one of said vertically spaced support members being an apertured cartridge means support sheet spaced from said inner face of said outer wall with a reinforcing tubular collar assembly surrounding each aperture thereof to receive said cartridge means and to guide reverse fluid flow, said cartridge means end including gasket members adapted to sealingly engage with said annular collar member.

6. The particulate filter structure of claim 1, said fluid flushing means being slidably adjustable in said particulate separating chamber relative said particulate filter cartridge means.

7. The particulate filter structure of claim 6, said fluid flushing means including solenoid control means located in a readily accessible opening in said outer wall means removed from said fluid flushing means.

8. The particulate filter structure of claim 1, said structure including control means for said particulate filter structure, said control means being positioned adjacent said inner face of said rear side of said outer housing wall, said rear side of said outer wall having a removable control access panel therein adjacent said control means; and, preselected status indicating gauges for said control means, said status indicating gauges being positioned adjacent said inner face of said front side of said outer housing wall, said front side of said outer wall having a removable gauge indication access panel therein adjacent said status indicating gauges.

9. The particulate filter structure of claim 1, said enclosed outer housing wall being comprised of modular sections to accommodate said particulate filter cartridge means including a preselected number of longitudinally extending particulate filter cartridges, each particulate filter cartridge comprising a longitudinally extending cylindrical filter media cartridge of annular cross-section with the longitudinally extending cylindrical outer face serving as the dirty fluid inlet and the longitudinally extending central core serving as a clean fluid outlet, said core being closed at one end and open at the other, said front side of said outer wall having a removal cartridge access panel means therein adjacent and independent of said particulate filter cartridge means.

10. The particulate filter structure of claim 1, said particulate dust hopper and catcher means including separable particulate catcher container means being transparent to visually determine the status of particulate collection.

11. The particulate filter structure of claim 1, said particulate hopper means including a downwardly and inwardly truncated outer wall with said particulate release opening adjacent the bottom thereof and with a separable particulate catcher container means communicating therewith; and, particulate catcher container support means mounted on said particulate hopper means and actuating means cooperative with said particulate catcher container support means serving to receive and support said particulate catcher means and said actuating means serving to urge said particulate catcher container means into sealed communicative relation with said particulate release opening of said particulate hopper means.

12. The particulate filter structure of claim 11, said particulate catcher container support means including spaced support bars movably mounted thereon; and, said actuating means comprising a handle member pivotally mounted on said particulate catcher container support means and adapted to actuate and release said particulate catcher support bars movably mounted on said particulate catcher container support means when said particulate catcher container means is resting thereon.

13. The particulate filter structure of claim 12, and magnetic holding means adapted to hold said pivotally mounted handle member in container release position against said truncated particulate hopper outer wall.

14. The particulate filter structure of claim 12, said particulate catcher container support means comprising a hopper extension of substantially downwardly extending U-shaped cross-section with opposed inwardly turned edges extending along the lower portion thereof to support said spaced moveable support bars.

15. The particulate filter structure of claim 12, said pivotally mounted handle member having an over-center caming member adapted to engage and urge said support bars into sealing position.

16. The particulate filter structure of claim 1, and baffle means disposed in said particulate separation chamber downstream said dirty gas inlet means and upstream said particulate filter cartridge means arranged to deflect larger particulate particles from said particulate filter cartridge means directly toward said particulate hopper and catcher means and to provide smoother dirty gas flow to said particulate filter cartridge means.

17. The particulate filter structure of claim 1, said particulate filter cartridge means including at least two spacedly adjacent filter cartridges with a baffle means disposed therebetween to minimize particulate migration and aspiration therebetween.

18. The particulate filter structure of claim 1, said dirty gas inlet means being adapted to receive dirty gas, selectively from opposite lateral sides of said outer housing.

19. Centering and fastening structure for a longitudinally extending particulate filter cartridge having a longitudinally extending central core with opposite ends thereof being open comprising: an apertured plate member adapted to receive one of said filter cartridge open ends; and, a push plate member removably urged into the opposite other end of said particulate filter cartridge by a supported longitudinally extending linear movable actuating bar with one end of said actuating bar serving as a turning handle and the opposite end engaging said push plate member.

20. An improved particulate hopper structure, said particulate hopper having a particulate release opening adjacent the lower portion thereof comprising: a particulate catcher container; a particulate catcher container support means including movable spaced support rails mounted on said particulate hopper release opening to receive and support on said movable spaced support rails said particulate catcher container; and a particulate catcher container actuating means cooperative with said particulate catcher container movable support rails on said container support means to urge said particulate catcher container into sealed communicative relation with said particulate hopper release opening.

21. The particulate hopper structure of claim 20, said particulate catcher container support means including said movable spaced support rails wherein said support rails are pivotally mounted thereon; and, a handle pivotally mounted on said support means to actuate and release said spaced pivotal support rails when said particulate container rests thereon.

22. The particulate hopper structure of claim 21, and a magnetic holder bar mounted adjacent the end of said pivotal handle to hold said handle when in container release position against said hopper.

23. The particulate hopper structure of claim 21, said particulate catcher container support means comprising a hopper extension of substantially downwardly extending U-shaped cross-section with opposed inwardly turned lower rail support edges to support said spaced pivotal rails thereon.

24. The particulate hopper structure of claim 21, said handle having over-center caming members to engage and urge said pivotal rails into container sealing position.

25. The particulate hopper structure of claim 21, said particulate catcher container being of status indicating transparency and having external side flanges restable on said pivotal spaced support rails.

26. Particulate filtering structure comprising: an enclosed, modular outer housing wall including a top side, spaced front and rear sides with spaced lateral sides therebetween, said sides having inner and outer faces with the inner faces thereof defining a particulate separation chamber therein with a particulate hopper and separable particulate catcher therebelow, said sides of said outer housing wall having spaced dirty gas inlet ports and clean gas outlet ports communicating with said particulate separation chamber so as to be accessible from either lateral side of said outer housing wall and having removably covered access openings in said sides respectively, said openings being sized and positioned to permit accessibility to select structural units disposed in said particulate separation chamber; particle deflecting baffles positioned adjacent and spacedly supported from said dirty gas inlet ports to deflect larger particulate particles in dirty gas streams downwardly directly toward said particulate hopper below the lower section of said particulate separation chamber and the remainder of said dirty gas streams uniformly downward toward the lower section of said particulate separation chamber; said lower section of said particulate separation chamber including two spaced cartridge support members extending vertically to be structurally mounted at vertically opposed ends and selectively spaced relation from opposed inner faces of said outer wall; one of said support members comprising a ported tube sheet sectioning said particulate separation chamber, said tube sheet having at least two spaced cartridge receiving ports, each port having a surrounding tubular guide collar extending along the perimeter thereof on that sectioned face of said tube sheet spacedly facing said inner face of an adjacent side of said outer wall with each port having fixed thereto on the opposite sectioned face thereof spaced pairs of support rests to support corresponding open ends of particulate filter cartridges thereon; at least two spaced cylindrical particulate filter cartridges with a longitudinally extending particulate deflecting baffle extending therebetween, each filter cartridge including cylindrically mounted outer filter media sheets surrounding an inner open ended core with one corresponding end of each cartridge being supported on a pair of support rests and having a hollow cylindrical gasket snugly engaging said port surrounding collar and with the opposite ends of each of said horizontally supported particulate filter cartridges each being directly spaced from the inner face of said opposed side walls of said outer housing and with the inner open ended core of each particulate filter cartridge communicating with at least one of said clean gas outlet ports; said other of said two spaced cartridge support members comprising at least two spaced vertically extending U-shaped channels aligned with said ports in said spaced ported tube sheets and positioned to be at the opposite ends of said filter cartridges, each U-shaped channel having a linearly, and horizontally extending actuating rod threadedly mounted in the base leg thereof arranged to be aligned with an opposite supported end of a particulate filter cartridge, one end of each of said actuating rods being shaped to serve as a turning handle for said rod with other end being internally threaded to receive a mounting screw; a filter cartridge push plate with opposed faces and a recessed central aperture extending therethrough for screw mounting to each actuating rod, each plate being adapted to be urged into sealing engagement with that end of said particulate filter cartridge opposite the tube sheet port supported end; said outer housing wall including a downwardly and inwardly truncated particulate hopper portion terminating in a particulate release opening; a particulate catcher container support horizontally extending from said particulate hopper in surrounding relation to said particulate release opening, said container support having a downwardly extending U-shaped cross-section with opposed inwardly turned support edges extending along the lower portion thereof; a pair of spaced particulate catcher support rails movably mounted above said rail support edges; a handle lever pivotally mounted on said particulate hopper, said handle lever having over-center caming members adapted to engagingly abut and urge said support rails into sealing position when a particulate catching container is mounted on said support rails; a moveable, transparent particulate catching container having a sealing gasket surrounding the peripheral rim thereof, a pair of externally mounted mating flanges on the sides of said particulate catching container adapted to rest on said support rails so as to be moveable into sealed position with said particulate release opening of said particulate hopper upon pivoting of said handle lever; said handle lever having a magnet mounted thereon adapted to hold said handle in container release position against the truncated particulate hopper outer wall; remote solenoid controlled pneumatic reverse fluid flush nozzles slidably adjustable in said particulate separating chamber to be in selected spaced alignment with said tubular guide collars and said internal core openings of said particulate filter cartridges to reverse flush said particulate filter cartridges; and, blower means to move a particulate laden gas stream from said dirty gas inlet means by said particulate deflecting baffles through said particulate filter cartridges to said clean gas outlets.

27. A particulate filter structure comprising: an enclosed outer housing wall having opposed inner and outer faces with said opposed inner faces defining a particulate separation chamber therein, said outer housing wall having spaced dirty gas inlet means and clean gas outlet means in communication with said particulate separation chamber defined by said outer housing wall; longitudinally extending particulate filter means disposed between spaced vertically extending end support means within said particulate separation chamber with said longitudinally extending particulate filter means being in spaced relation to said opposed inner faces of said outer wall; blower means to move a particulate laden gas stream from said dirty gas inlet means through said particulate filter means to said clean gas outlet means; baffle means disposed in said particulate separation chamber downstream said dirty gas inlet means and upstream said longitudinally extending particulate filter means to deflect larger particulate particles around said longitudinally extending particulate filter means; reverse fluid flushing means to flush particulate particles from said longitudinally extending particulate filter means; and particulate hopper collection and catcher means communicating with said particulate separating chamber to receive directly said baffle deflected larger particulate particles and said reverse flushed particulate particles.

28. The particulate filter structure of claim 27, said particulate separation chamber including at least two separate communicating sections, one of which sections includes said particulate filter means in communication between said dirty gas inlet means and said particulate hopper collection and catcher means and the other section including said blower means in communication with said clean gas outlet means.

29. The particulate filter structure of claim 27, said longitudinally extending particulate filter means being horizontally mounted, spaced, particulate filter cartridges with said baffle deflecting larger particulate material to flow around opposed ends of said cartridges and with the dirty gas stream flowing through said filter cartridges.

30. The particulate filter structure of claim 27, said particulate hopper collection and catcher means comprising separable hopper and catcher units with said catcher unit being visually transparent and removably sealable to said hopper unit.

31. The particulate filter structure of claim 27, said reverse fluid flush means being adjustably mounted with respect to said particulate filter cartridges.

32. A method of removing particulate matter from a particulate laden gas stream comprising: introducing said gas stream into an enclosed gas treating zone having a spaced dirty gas inlet and a clean gas outlet with communicating first, second, third and fourth treating sections therebetween; moving said gas stream vertically through spaced particulate deflection and filtration stations in said first section of said gas treating zone at sufficient velocity to deflect and divert large particulates from said gas stream around said filtration station directly to a particulate collection station in said communicating second section in said zone while passing said gas stream through said filtration station into said third and fourth communicating sections having reverse flushing and blower stations respectively therein; and, passing a reverse flushing fluid stream from said reverse flushing station in said third communicating treating section in said zone to said first communicating section in said zone to move entrained particulate matter from said filtration station therein to said particulate collection station in said second communicating section.

33. The method of removing particulate matter of claim 32, wherein the status of particulate matter in said collector station in said second section can be visually observed and removed intermittently from said enclosed zone.

34. The method of removing particulate matter of claim 32, wherein said particulate laden gas stream is passed through an elongated filtration media sheet surrounding a central outlet core in said filtration station in said first treating section.

* * * * *